(12) United States Patent
He et al.

(10) Patent No.: US 6,476,965 B1
(45) Date of Patent: Nov. 5, 2002

(54) DRY ERASABLE AND PROJECTION ARTICLES AND METHODS OF MAKING THE SAME

(75) Inventors: LiJuan He, Hudson; Seth Levenstein, Mentor, both of OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/466,146

(22) Filed: Dec. 17, 1999

(51) Int. Cl.[7] .............................. B32B 5/16; G03B 21/56
(52) U.S. Cl. ...................... 359/455; 359/452; 359/443; 359/447; 428/325; 428/424.6
(58) Field of Search ................. 359/455, 452, 359/443, 447; 428/325, 14, 424.6

(56) References Cited

U.S. PATENT DOCUMENTS

| | | | |
|---|---|---|---|
| 3,549,463 A | 12/1970 | Frech | 161/2 |
| 3,846,011 A | * 11/1974 | Stein | 350/117 |
| 5,200,853 A | * 4/1993 | Berkman | 359/443 |
| 5,300,331 A | 4/1994 | Schaeffer | 427/493 |
| 5,361,164 A | 11/1994 | Steliga | 359/455 |
| 5,490,956 A | 2/1996 | Kito et al. | 252/583 |
| 6,067,266 A | 5/2000 | Donelan | 365/218 |

OTHER PUBLICATIONS

PCT/US00/33563; International Search Report mailed Apr. 23, 2001.

* cited by examiner

*Primary Examiner*—Daniel Zirker
(74) *Attorney, Agent, or Firm*—Renner, Otto, Boisselle & Sklar, LLP

(57) ABSTRACT

The invention relates to an article, useful as a dry erasable substrate and projection screen, comprising a top layer which is dry erasable and whose surface has a 60° gloss of less than about 60. The article provides a projection surface which has low gloss and therefore causes little eye strain and viewer fatigue. The dry erase board provides good write/rewrite characteristics, erasability, including wet erasability and has good image projection. The article may additionally have one or more of layers which include a pressure sensitive adhesive, support layer, a pigmented layer which is a pressure sensitive adhesive or a pigmented polymer or polymer blend, and a back coat which is optionally pigmented.

44 Claims, 1 Drawing Sheet

DRY ERASABLE AND PROJECTION ARTICLES AND METHODS OF MAKING THE SAME

TECHNICAL FIELD OF THE INVENTION

This invention relates to articles which are useful as a dry erase board and a projection screen, as well as methods of making the same. More specifically, the invention relates to articles which have a dry erasable topcoat with a specific gloss and a pigmented layer.

BACKGROUND OF THE INVENTION

Office environments are usually occupied with a writing board such as a chalk or dry erase board and a projector screen. Businesses are often changing their facilities to accommodate changes in personal and business needs. Often rooms are redesigned to provide conference rooms which were once personal office space. Conference rooms previously contained both a writing board and a projection screen. It is desirable to provide a single article which can meet the need for the writing surface and projection screen.

Dry erase boards have been used as a writing surface for years because of their convenience and versatility. The boards provide a means for expression which eliminates the mess and trouble of a chalk board. These boards however are not useful as projection surfaces because of the glare associated with the surface of the dry erase board. If the ordinary dry erase board was used as the projection surface the glare and reflection of the projection bulb leads to eye strain and fatigue to the viewers.

It is desirable to have a multi functional article which acts effectively as a dry erase board and a projection screen.

U.S. Pat. No. 5,200,853, issued to Berkman, relates to a board for screening and writing and a method for the production thereof. The patent discloses a durable multipurpose screening board which comprises an upper section comprising at least two superposed layers of transparent overlay sheets, each of the sheets weighing between 2 and 120 grams per square meter and having been soaked in a solution or melt of a polymeric resin material to subsequently form an intermediate solid plastic layer, the upper surface of the upper sheet being roughened by a plurality of closely-spaced complementary depressions of the depth between 0.01 mm and 0.2 mm, the core section comprising a paper sheet weighing between 60 and 140 grams per square meter and having soaked in a solution or melt of a polymeric resin material to subsequently form an intermediate solid plastic layer.

U.S. Pat. No. 5,361,164, issued to Steliga, relates to a projection markerboard. The markerboard has a bi-directional lenticular embossed surface. The light reflecting writing surface is preferably made of a thin film of fluoropolymer, such as a modified copolymer of ethylene and tetrafluoroethylene.

SUMMARY OF THE INVENTION

The invention relates to an article, useful as a dry erasable substrate and projection screen, comprising a top layer which is dry erasable and whose surface has a 60° gloss of less than about 60. The article provides a projection surface which has low gloss and therefore causes little eye strain and viewer fatigue. The dry erase board provides good write/rewrite characteristics, erasability, including wet erasability and has good image projection. The article may additionally have one or more of layers which include a pressure sensitive adhesive, support layer, a pigmented layer which is a pressure sensitive adhesive or a pigmented polymer or polymer blend, and a back coat which is optionally pigmented.

BRIEF DESCRIPTION OF THE INVENTION

DETAILED DESCRIPTION OF THE INVENTION

Figure 1:
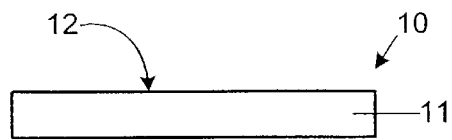
FIG. 1 is a cross section of a dry erasable article useful as a projection screen.

As described herein the present invention relates to a dry erasable article which is also useful as a projection screen. The article has a surface which provides dry erasable characteristics.. The surface will provide a non beading surface where dry erasable ink is easily removed with mechanical pressure from an eraser, rag or towel. The surface has a 60° gloss of less than about 60. In one embodiment, the surface has a 60° gloss from about 10 to about 50, or from about 25 to about 40. The gloss is determined by ASTM D523-85 test procedure. In one embodiment, the surface has a roughness of about 2000 to about 13,000, or from about 3,000 to about 12,500, or from about 7,500 to about 11,000 angstroms. The roughness is determined by profilometer.

The surface, in one embodiment, has a hardness sufficient to withstand the mechanical pressures of marking and movement around a business environment. The surface typically has a pencil hardness of about 2H to about 6H, or about 4H. Dry erasable ink is easily removed from the surface without any residual ink remaining. The ink that remains typically is referred to as shadowing. In one embodiment, the surface is smooth. In another embodiment, the surface is other than a lenticulated surface.

The dry erasable surface is found on the top layer of the article of the present invention. The top layer comprises a polyurethane, a melamine resin, a polyester, a polyacrylate, polymethacrylate, a polyolefin or blends of two or more thereof. The top layer typically has a thickness from about 0.25 to about 5, or from about 0.75 to about 2, or about 1.5 mil.

In one embodiment, the top layer comprises at least one polyurethane. The polyurethane is prepared by reacting at least one isocyanate and at least one polyol. The polyurethane is prepared by reacting from about 0.5 to about 2, or from about 0.9 to about 1.85, or about 1.05 NCO to each OH.

In one embodiment, the polyurethane is derived from a polyisocyanate and a polyfunctional active hydrogen compound. The polyisocyanates may be any of the known polyisocyanates, such as aliphatic or aromatic polyisocyanates, used to form urethane resins.

The polyisocyanates useful in preparing the polyurethanes used in the present invention may generally correspond to the formula $$Q(NCO)_x \qquad (I)$$

in which x is at least 2 and Q represents a di-, tri-, or tetravalent-aliphatic hydrocarbon group containing from 2 to 100 carbon atoms, and 0 to 50 heteroatoms or a cycloaliphatic hydrocarbon group containing from 4 to 100 carbon atoms and 0 to 50 heteroatoms, or a substituted or non-substituted aromatic group. The heteroatoms that can be present in Q include non-peroxidic oxygen, sulfur, non-amino nitrogen, halogen, silicon and phosphorus.

Examples of polyisocyanates represented by Formula I include ethylene diisocyanate, 1,4-tetramethylene diisocyanate, 1,6-hexamethylene diisocyanate (HDI), 1,12-dodecane diisocyanate, cyclobutane, 1,3-diisocyanate, 1-isocyanato-3,3,5-trimethyl-5-isocyanato methyl cyclohexane, bis(4-isocyanato cyclohexyl)methane, isophorone diisocyanate (IPDI), bis(4-isocyanatocyclohexo) methane; 4,4'-methylenedicyclohexyl diisocyanate; 1,6-diisocyanato-2,2,4,4-tetramethylhexane; 1,6-diisocyanato-2,4,4-trimethylhexane; cyclohexane-1,4-diisocyanate; etc. Desmodur H® from Bayer Inc. is described as HDI having an NCO content of 50%, and Desmodur W from Bayer Inc. is described as bis(4-isocyanato-cyclohexyl)methane containing 32% of NCO.

Higher molecular weight polyisocyanates also are useful and are often preferred because the diisocyanates are toxic and raise industrial hygiene concerns. Examples of polyisocyanates include adducts, prepolymers and isocyanate trimers. For example, the trimethylol propane adducts of the various monomeric isocyanates such as HDI and isophorone diisocyanate (IPDI) are useful. Biurets of the diisocyanates also are useful and are commercially available. For example, the biuret of HDI is available as Desmodur N from Bayer Inc. Desmodur N-75 and Desmodur N-100 are examples of commercially available biuret of HDI, and Desmodur Z-4470 is a biuret of IPDI. Both of these materials are available from Bayer Inc.

Diisocyanates also can be converted to trimers that contain an isocyanurate ring. Trimers of HDI are available commercially from Bayer under the trademarks Desmodur N-3300 and Desmodur N-3390.

The polyfunctional active hydrogen compounds which may be reacted with the polyisocyanates include polyols, polyether polyols, polyester polyols, hydroxy-terminated polyesters, acrylic polyols, polyester amides, polycaprolactone polyols, etc. Polyester polyols and polyether polyols are preferred, and the polyols may comprise diols, triols, and combinations thereof. Polyether polyols are prepared by the polymerization of alkylene oxides with suitable initiators having active hydrogens in their structure. Examples of polyether diols include poly(oxyethylene)glycols and poly(oxypropylene)glycols. Examples of polyether triols include poly(oxypropylene)triol which are prepared by the base-catalyzed reaction of propylene oxide with low molecular weight triols such as trimethylol propane, glycerol, and 1,2,6-hexane triol.

Polyester polyols also are useful in preparing the polyurethanes useful in the present invention. Polyester polyols are generally prepared by reacting one or more dicarboxylic acids such as adipic acid, glutaric acid, sebacic acid, suberic acid, azelaic acid, dodecanoic acid, succinic acid, cyclohexane dicarboxylic acid, phthalic acid, isophthalic acid, hexahydrophthalic acid, dimerized linoleic acid ("Dimer" acid), and/or their corresponding anhydrides with one or more diols and triols. Mixtures of the dicarboxylic acids also can be used. The glycols which are used in the preparation of the polyester polyols generally include ethylene glycol, 1,2-propylene glycol, 1,3-propanediol, 2-methyl-1,3-propanediol, 1,3-butylene glycol, 1,4-butylene glycol, 1,6-hexanediol, diethylene glycol, neopentyl glycol, and diethylene glycol. The triols are usually glycerine, 1,2,6-hexane triol, Trimethylol propane, and trimethanol ethane. In some instances, pentaerythritol may be used.

In one embodiment, the polyol is at least one acrylic polyol. The acrylic polyol polymer preferably has a hydroxyl number of about 50 to about 300 or from about 75 to about 200 or about 80 to about 170, and a molecular weight of about 1,000 to 20,000 or from about 2,000 to about 10,000, or from about 400 to about 7,000. The hydroxyl number can be determined by any art-recognized method such as by theoretical calculation or by analytical methods. The acrylic polyol polymer is prepared by polymerizing one or more hydroxyl functional alkyl acrylate or methacrylate monomers and up to about 80 percent by weight ethylenically unsaturated non-hydroxyl functional monomers, based on the weight of the acrylic polyol. Suitable hydroxyl functional alkyl acrylate or methacrylate monomers include hydroxyethyl acrylate and methacrylate, hydroxypropyl acrylate and methacrylate, hydroxybutyl acrylate and methacrylate, and the like. Suitable ethylenically unsaturated non-hydroxyl functional monomers include alkyl and aryl acrylates and methacrylates having 1 to 16 carbon atoms in the alkyl or aryl groups as are known to those skilled in the art. Other suitable ethylenically unsaturated non-hydroxyl functional monomers include styrene, methyl styrene, acrylamide, acrylonitrile, and the like. Examples of useful acrylic polyols include Reactol 100 (hydroxl number 100, molecular weight 4,500, and equivalent weight 560) and Reactol 180 (hydroxyl number 160, molecular weight 5,000, and equivalent weight 340) available from Lawter International, Inc.

The polyurethane is prepared by means know to those in the art. Polyurethanes, isocyanates, polyols, and methods of making polyurethanes are disclosed in U.S. Pat. No. 5,514,441 Pohto, et al. This patent is hereby incorporated by reference.

The top layer may contain other conventional additives such as color stabilizers, inhibitors, antioxidants, ultraviolt absorbers, pigments, extenders, plasticizers, flatting agents, fillers, etc. These materials are known to those in the art. Although fillers such as silica can be included in films. The flatting agents act to control gloss and are generally present in an amount from about 0.5% to about 10%, or from about 2% to about 8% by weight. Flatting agents include those additives used in paints for controlling the matte of the finish. These additives include diatomaceous earth, Gasil Silica, Syloid Silica, wax, mica, Propylmatte family, AEROSIL, Cab-O-Sil, BUSAN flatting agent, etc.

The top layer also may contain at least one non-reactive solvent such as toluene, ethyl acetate, butyl acetate, PM acetate, etc. The amount of solvent present may vary over a wide range, but the amount of solvent generally will be in the range of from 0% to about 70% by weight and more often from about 20% to about 35% by weight. The actual amount of solvent required will vary with selected processing methods.

The following examples provide general and specific illustrations of the top layers described above.

EXAMPLE A

| Components | Range (weight) |
|---|---|
| Part A | |
| Polyol | 15–55 |
| UV Stabilizers | 0.5–2 |
| Solvents | balance |
| Flow Agents | 0.1–1.5 |
| Inhibitor | 0.1–1 |
| Catalyst | 0.005–0.1 |
| Flatting agent | 1–10 |
| PART B | |
| Diisocyanate | |
| Part A | 50–95 |
| Part B | 50–5 |
| NCO/OH Ratio | 0.8–1.2 |

EXAMPLE B

| Components | Weight (g) |
|---|---|
| Part A | |
| Acrylic polyol[1] | 47.09 |
| Stabilizer | 1.32 |
| PM Acetate | 14.13 |
| Butyl Acetate | 6.42 |
| Polyacrylate flow modifier | 0.28 |
| Cellulose acetate butyrate | 0.24 |
| 2,4 Pentanedione | 0.35 |
| Dibutyl Tin Sulfide | 0.02 |
| Silicone gel (5% water) | 6.75 |
| PART B | |
| 1,6 Hexamethylene Diiisocyanate | |
| Part A | 78.86 |
| Part B | 21.14 |
| NCO/OH Ratio | 1.05 |

[1] acrylic polyol having a hydroxyl number of 160, and equivalent weight of 340 and a molecualr weight of 5000

EXAMPLE C

| Components | (Parts by weight) |
|---|---|
| Part A | |
| Acrylic polyol of Ex. B | 46.88 |
| Stabilizer | 1.32 |
| Polyether modified dimethylpolysiloxane | 0.69 |
| 2,4 Pentanedione | 0.33 |
| PM Acetate | 20.88 |
| Dimethyl, methyl(polyethylene oxide) siloxane (78 wt %), | 0.53 |
| Cellulose acetate butyrate | 0.23 |
| Dibutyl Tin Sulfide | 0.03 |
| Silicone gel (5% water) | 4.13 |
| Butyl Acetate | 3.96 |
| PART B | |
| 1,6 Hexamethylene Diiisocyanate | |
| Part A | 79.0 |
| Part B Isocyanate | 21.0 |
| NCO/OH Ratio | 1.05 |

When the dry erasable layer is pigmented, then the dry erasable layer may be used an a monolayer erasable article and projection film. As illustrated with FIG. 1, article 10 has film layer 11, such as a polyurethane film which is pigmented to provide reflection and a surface 12 with a 60° gloss of less than 60. The pigment may be any pigment which provides the reflectance in the film. For instance, calcium carbonate, titanium dioxide may be used to provide reflectance. In one embodiment, the pigment is a color other than white such as grey, biege, etc. The pigments are know to those in the art.

In another embodiment, the dry erasable projection article is a multilayer structure with a top layer providing the dry erase character and another pigmented layer for providing reflectance of the image from the projector. The pigmented layer may be directly below the dry erase layer or may be separated from the dry erase layer by one or more intermediate layerS. The pigmented layer may be an adhesive or polymeric layer. The pigmented layer may be separated from the dry erase layer by one or more layers of transparent adhesives or polymers.

Figure 2:
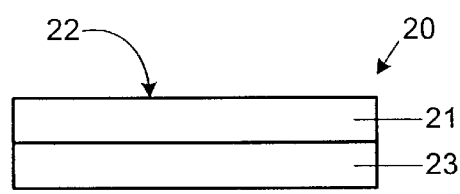
FIGS. 2–3 are a cross sections of a multilayer dry erasable articles useful as a projection screen.

In reference to FIG. 2, article 20 is useful as a dry erasable projection screen. The article has a top layer 21 which has a dry erase surface 22. The dry erase top layer 21 is adhered to adhesive 23. The adhesive layer may be any adhesive which will secure the dry erase film to a substrate. Conventional pressure-sensitive adhesives, such as acrylic-based adhesives, or heat- or solvent-activated adhesives are typically used and may be applied by conventional procedures. These materials may be permanent or removable pressure sensitive adhesives. These materials include acrylic polymers, acrylic esters, silicones, polyvinyl esters, rubbers and urethanes. The adhesive may be a solvent or emulsion based rubber or acrylic adhesives such as those that are available in the art. These pressure sensitive adhesives include those such as Aroset® resin (an acrylic-based pressure sensitive adhesive) available commercially from Ashland Chemical and Gelva® adhesive available commercially from Solutia.

Figure 3:
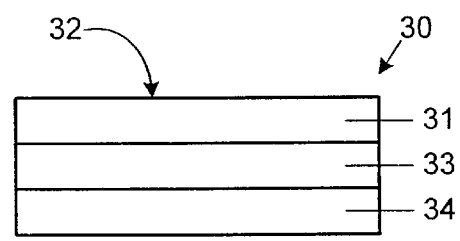

In another embodiment the pigmented adhesive layer is separated from the top layer by a polymeric layer. The polymeric layer is typically clear but may contain pigments. Referring to FIG. 3, article 30 has top layer 31 with dry erase surface 32 and adhered to polymeric layer 33. Polymeric layer 33 may be directly in contact with top layer 31 or may be connected through one or more tie layers. The tie layers may be any of the above described polymers. In one embodiment the tie layer is a polyester or polyurethane tie layer. The adhesive layer 34 is adhered to polymeric layer 33 and may also have a release liner releasably adhered thereto, such as a silicone release layer.

In another embodiment the dry erasable projection article has a pigmented polymer layer. The pigmented polymeric layer may be directly adherred to the dry erase layer or may be bonded to the dry erase layer through a clear adhesive layer. The resins that may be used for the polymeric layer include a variety of partially amorphous or semi-crystalline thermoplastic polymers. Acrylics, polyvinylbutyrals, polyurethanes and polyesters are particularly useful. Copolymers of ethylene and an acrylic acid or methacrylic acid; vinyls, fluoropolymers, polyethylenes, cellulose acetate butyrate, polycarbonates and polyacrylates are other examples of polymers that can be used for the pigmented polymeric layer.

Of course, it is recognized that additional layers of adhesive and polymeric layers, either transparent or pigmented, may be used for structural support and aesthetic reasons. For instance in FIG. 3, additional combinations of layers 33 and 34, such as a second combination of a polymeric layer and adhesive may be adhered to the polymeric 33.

In another embodiment, the dry erasable projection screen contains a bead matrix layer. The bead matrix layer comprises one or more polymers and glass beads. The glass beads provide improved light management, such as light gain, for the projection aspects of the article. Typically the glass beads are characterized as having an average refractive index in the range of about 1.8 to about 2.5, or from about 1.9 to about 2.4, or from about 2.1 to about 2.3 and an average diameter of about 35 to about 100, or from about 45 to about 90, or from about 55 to about 80 microns.

Glass microspheres are typically used although ceramic microspheres such as those made by sol/gel techniques can also be used.

The bond matrix layer also contains a polymeric resin. Various thermoplastic polymeric resins have been used previously in forming the bead matrix layer, and such resins can be used in the pigmented polymeric layer of the present invention.

Figure 4:
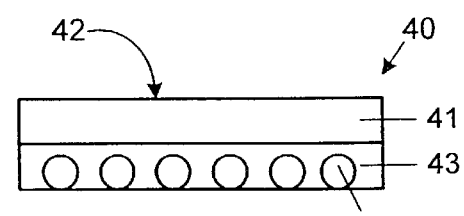
FIG. 4–7 are cross sections of a dry erasable articles which contain glass beads and which are useful as a projection screen.

Referring to FIG. 4, dry erase, projection article 40, has top layer 41, with dry erase surface 42. Top layer 41 is adhered to bead matrix layer 43 containing glass beads 44. The bead matrix layer is thinner than the average diameter of the glass beads. Typically the thickness is from about 0.5 to about 3, or from about 0.75 to about 2 mils.

Figure 5:
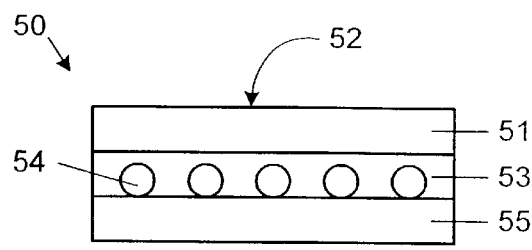

The bead matrix layer may be adhered to a pigmented layer, such as those discussed above. Referring to FIG. 5, article 50 with top layer 51, with dry erase surface 52, is adhered to bead matrix layer 53 having glass beads 54. The bead matrix layer 53 contacts pigmented layer 55 which is either a pigmented adhesive or a pigmented polymeric layer. The pigmented polymeric layer may be adhered to the bead matrix layer through another adhesive layer.

Figure 6:
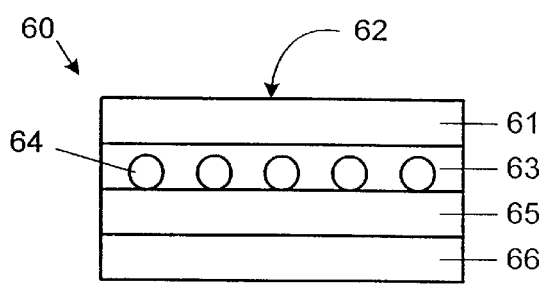

The dry erase construction may also have a support layer. The support layer provides structural integrity to the dry erase construction. The support layer is typically a layer of one or more of the polymers described above for the pigmented layer. Polyvinylchloride is an example of a material which could be used as in the support layer. The support layer typically has a thickness from about 1 to about 5 mil. Further illustration of the support layers of the article is found in reference to FIG. 6, which has article 60 with top layer 61 with dry erase surface 62. The top layer is adhered to bead matrix layer 63 containing glass beads 64. The bead matrix layer 63 is also adhered to pressure sensitive adhesive 65, which in turn is releasably adhered to release liner 66.

Figure 7:
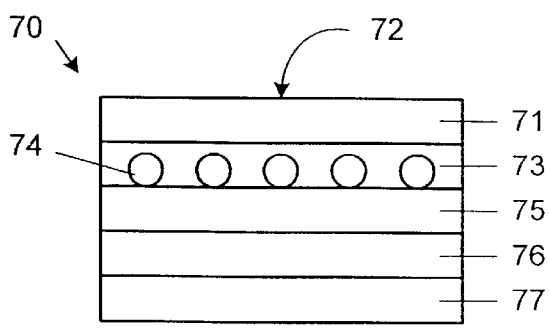

Another construction is shown in FIG. 7 where article 70 has top layer 71 with dry erase surface 72. Top layer 71 is adhered to bead matrix layer 73 containing glass beads 74. The bead matrix layer is adhered to pressure sensitive adhesive 75 which is also adhered to polymeric layer 76. Polymeric layer 76 is also adhered to another adhesive layer 77 that in turn may be releaseably adhered to a release liner (not shown). The either adhesive layer or polymeric layer may pigmented. More than one of these layers may be pigmented as well.

The following examples relate to the dry erase projection film of the present invention.

EXAMPLE 1

A dry erase projection article is prepared by casting the urethane composition of Example B over the top of a bead matrix layer of glass microspheres and polyvinylbutyral. The urethane is cured for approximately 5 minutes at temperatures ranging from about 160° F. to 250° F.

EXAMPLE 2

The urethane composition of Example C is cast on 3 mil PET film as shown in FIG. 2. The dry erase, projection construction gave the following results.

| | |
|---|---|
| 1. Dry eraseablity: | Immediately erase after ink drys—excellent<br>Erase after 7 days aging at room temperature—excellent<br>Erase after 7 days aging at 140° F.—excellent |
| 2. 60° gloss: | 52 to 58 |
| 3. Hardness: | 4H |
| 4. Roughness: | 2860 to 3320 angstroms |

EXAMPLE 3

The top layer of Example 2 is adhered to a polyvinylbutyral layer containing glass beads (2.1 R.I. and an average diameter of 50 microns). The polyvinylbutyral layer is adhered to a 1.5 mil white PVC film by acrylic pressure sensitive adhesive. The construction gave the following test results.

| | |
|---|---|
| 1. Dry eraseablity: | Immediately erase after ink drys—excellent<br>Erase after 7 days aging at room temperature—excellent<br>Erase after 7 days aging at 140° F.—good, after using cleaner—excellent |
| 2. 60° gloss: | 26 to 34 |
| 3. Hardness: | 4H |
| 4. Roughness: | 8600 to 10800 angstroms |
| 5. Light gain: | 1.6 at 0° view angle (head on), 1.0 to .95 at ±10° to ±70° view angles |

EXAMPLE 4

Example 3 was repeated except that the polyvinylbutyral layer is adhered to a cool grey colored PVC film. The construction gave the following test results.

| | |
|---|---|
| 1. Dry eraseablity: | Immediately erase after ink drys—excellent<br>Erase after 7 days aging at room temperature—excellent<br>Erase after 7 days aging at 140° F.—good, after using cleaner—excellent |
| 2. 60° gloss: | 26 to 34 |
| 3. Hardness: | 4H |

-continued

| 4. Roughness: | 8600 to 10800 angstroms |
| 5. Light gain: | 1.45 at 0° view angle (head on), 1.0 to .85 at ±10° to ±70° view angles |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An article, useful as a dry erasable substrate and projection screen, comprising a dry erasable layer whose surface has a 60° gloss of less than about 60; at least one pigmented layer, the pigmented layer being a pigmented polymer or blend; and a bead matrix layer comprising glass beads, wherein the bead martix is adhered between the dry erasable layer and the pigmented layer.

2. The article of claim 1, wherein the surface has a 60° gloss of about 10 to about 40.

3. The article of claim 1, wherein the dry erasable layer has a thickness from about 0.25 to about 5 mil.

4. The article of claim 1, wherein the dry erasable layer has a pencil hardness of at least about 4H.

5. The article of claim 1, wherein the dry erasable layer comprises a polyurethane, a polyester, a polyacrylate, polymethacrylate, a polyolefin or blends of two or more thereof.

6. The article of claim 1, wherein the dry erasable layer comprises at least one polyurethane or melamine resin.

7. The article of claim 1, wherein the pigmented polymer is a polyvinylcarboyzlate, a polyolefin, a polyurethane, a vinyl polymer or a combination of two or more thereof.

8. The article of claim 1, wherein the pigmented polymer is a polyvinylchoride or polyvinylbutyral.

9. The article of claim 1, wherein the pigmented layer is adhered to the dry erasable layer.

10. The article of claim 1, further comprising a support coat layer adhered to the dry erasable layer.

11. The article in claim 10 wherein the support layer is a polyvinylbutyal, polyvinylcarboyxlate, a polyolefin, a polyurethane, a vinyl polymer or a combination of two or more thereof.

12. The article in claim 10 wherein the support layer is a polyvinylchloride.

13. The article in claim 1 wherein the glass beads have refractive index of about 1.65 to about 2.2.

14. The article in claim 1 wherein the glass bead has an average diameter from about 38 to about 150 microns.

15. The article of claim 1, wherein the dry erasable layer is a combination of a polymer and flatting agent.

16. A substrate adhered to the article of claim 1.

17. The substrate of claim 16 wherein the substrate is a wall or panel.

18. An article, useful as a dry erasable substrate and projection screen, comprising a dry erasable layer having a 60° gloss of less than 60 and a bead matrix layer adhered to the dry erasable layer wherein the bead matrix layer comprises glass beads.

19. The article of claim 18 wherein the dry erasable layer comprises a polyurethane, a polyester, a polyacrylate, polymethacrylate, a polyolefin or blends of two or more thereof.

20. The article of claim 18 wherein the dry erasable layer comprises at least one polyurethane or melamine resin.

21. The article of claim 18 wherein the article further comprises at least one pigmented layer.

22. The article of claim 21 wherein the pigmented layer is at least one pressure sensitive adhesive and is bonded to the dry erasable layer.

23. The article of claim 21 wherein the pigmented layer is a pigmented polymer or blend.

24. The article of claim 23 wherein the pigmented polymer is a polyvinylcarboyxlate, a polyolefin, a polyurethane, a vinyl polymer or a combination of two or more thereof.

25. The article of claim 23 wherein the pigmented polymer is a polyvinylchloride or polyvinylburtyral.

26. The article or claim 23 wherein the pigmented layer is adhered to the bead matrix layer.

27. The article of claim 21 further comprising a support layer adhered to the pigmented layer.

28. The article of claim 27 wherein the support layer is pigmented.

29. The article of claim 27 wherein the support layer comprises a polyvinlylcarboyxalate, a polyolefin, a polyurethane, a vinyl polymer or a combination of two or more thereof.

30. A substrate adhered to the article of claim 18.

31. The substrate of claim 30 wherein the substrate is a wall or panel.

32. An article, useful as a dry erasable substrate and projection screen, comprising:

a dry erasable polyurethane or melamine resin layer whose surface has a 60° gloss of less than about 60.

at least one pigmented polyvinlchloride or polyvinylbutyral layer; and a bead matrix layer comprising glass beads, wherein the bead matrix is adhered between the dry erasable layer and the pigmented layer.

33. The article of claim 32, wherein the surface has a 60° gloss of about 10 to about 40.

34. The article of claim 32, wherein the dry erasable layer has a thickness from about 0.25 to about 5 ml.

35. The article of claim 32, wherein the dry erasable layer ha a pencil hardness of at least about 4H.

36. The article of claim 32, wherein the pigmented layer is adhered to the dry erasable layer.

37. The article of claim 32, further comprising a support coat layer adhered to the pigmented layer and the dry erasable layer.

38. The article of claim 37, wherein the support layer is a polyvinylbutyral, polyvinylcarboyxlate, a polyolefin, a polyurethane, a vinyl polymer or a combination of two or more thereof.

39. The article of claim 37, wherein the support layer is a polyvinylchloride.

40. The article of claim 32 wherein the glass beads have a refractive index of about 1.65 to about 2.2.

41. The article of claim 32 wherein the glass bead has an average diameter from about 38 to about 150 microns.

42. The article of claim 32 wherein the dry erasable layer is a combination of a polymer and flatting agent.

43. A substrate adhered to the article of claim 32.

44. The substrte of claim 43 wherein the substrate is a wall or panel.

* * * * *